United States Patent
Merle et al.

(10) Patent No.: US 10,207,340 B2
(45) Date of Patent: Feb. 19, 2019

(54) MACHINING DEVICE FOR OUTER PIPE SURFACES

(71) Applicant: PF-Schweißtechnologie GmbH, Alsfeld (DE)

(72) Inventors: Bernd Merle, Alsfeld (DE); Achim Spychalski-Merle, Alsfeld (DE)

(73) Assignee: PF-Schweißtechnologie GmbH, Alsfeld (DE)

( * ) Notice: Subject to any disclaimer, the term of this patent is extended or adjusted under 35 U.S.C. 154(b) by 477 days.

(21) Appl. No.: 14/698,231

(22) Filed: Apr. 28, 2015

(65) Prior Publication Data
US 2015/0306682 A1  Oct. 29, 2015

(30) Foreign Application Priority Data
Apr. 28, 2014 (DE) .................. 10 2014 006 255

(51) Int. Cl.
*B23B 5/08* (2006.01)
*B23C 3/12* (2006.01)
(Continued)

(52) U.S. Cl.
CPC ............ *B23C 3/122* (2013.01); *B23B 5/08* (2013.01); *B23C 3/02* (2013.01); *B23D 45/126* (2013.01);
(Continued)

(58) Field of Classification Search
CPC ... B23B 2260/028; B23B 5/08; B23D 45/126; B24B 9/007; B23C 3/02; B23C 3/122;
(Continued)

(56) References Cited

U.S. PATENT DOCUMENTS

| 1,183,158 | A | * | 5/1916 | Auble | ............... | B23D 21/04 |
| | | | | | | 266/56 |
| 1,932,462 | A | * | 10/1933 | Howlett | ........... | B23D 45/126 |
| | | | | | | 266/56 |

(Continued)

FOREIGN PATENT DOCUMENTS

| DE | 2315132 A1 | 10/1974 |
| DE | 29603667 U1 | 3/1997 |

(Continued)

OTHER PUBLICATIONS

DE10 2014 006 255.4 Office Action dated Feb. 20, 2015.

*Primary Examiner* — Sara Addisu
(74) *Attorney, Agent, or Firm* — Hahn Loeser & Parks LLP; John J. Cunniff

(57) ABSTRACT

A machining device for machining the lateral surface of an approximately cylindrical object in portions thereof includes a chain for annularly surrounding the object to be machined. The chain consists of at least two hingedly connectable chain links, one of which is a tool holder having at least one tool for machining the lateral surface. The device also includes support rollers for rolling on the lateral surface. The at least one other chain link is a chain connecting link. The chain links are connectable in such a way that they form a closed chain ring around the object to be machined. The machining device further includes a feed adjuster capable of reversibly adjusting an axial position of facing ends of two chain links parallel to the axis of the closed chain ring relative to each other.

20 Claims, 4 Drawing Sheets

(51) Int. Cl.
  *B23D 45/12* (2006.01)
  *B24B 9/00* (2006.01)
  *B23C 3/02* (2006.01)
  *B29C 37/04* (2006.01)
  *B29C 65/20* (2006.01)
  *B29C 65/00* (2006.01)

(52) U.S. Cl.
  CPC ............. *B24B 9/007* (2013.01); *B29C 37/04* (2013.01); *B23B 2260/028* (2013.01); *B29C 65/20* (2013.01); *B29C 66/02241* (2013.01); *B29C 66/1142* (2013.01); *B29C 66/3262* (2013.01); *B29C 66/522* (2013.01); *B29C 66/5221* (2013.01)

(58) Field of Classification Search
  CPC ... B29C 37/04; B29C 65/20; B29C 66/02241; B29C 66/522; B29C 66/5221
  See application file for complete search history.

(56) References Cited

U.S. PATENT DOCUMENTS

| | | | | |
|---|---|---|---|---|
| 2,291,395 | A * | 7/1942 | Levey | B23D 45/126 266/56 |
| 2,716,280 | A * | 8/1955 | Ruhe | B23D 21/08 30/100 |
| 2,914,891 | A * | 12/1959 | Nix | B23D 21/08 266/56 |
| 2,914,894 | A | 12/1959 | Hansen | |
| 3,157,945 | A * | 11/1964 | Picking | B23D 21/08 30/100 |
| 3,555,239 | A * | 1/1971 | Kerth | B23K 9/0286 219/121.63 |
| 3,702,913 | A * | 11/1972 | Kazluaskas | B23K 9/0286 219/159 |
| 3,807,047 | A * | 4/1974 | Sherer | B23D 21/02 30/101 |
| 3,942,248 | A * | 3/1976 | Sherer | B23D 21/02 30/103 |
| 3,943,626 | A * | 3/1976 | Williams | B23D 21/10 30/100 |
| 4,048,720 | A * | 9/1977 | Wheeler | B23Q 9/0014 144/73 |
| 4,205,573 | A * | 6/1980 | D'Angelo | B26D 3/006 83/56 |
| 4,490,909 | A * | 1/1985 | Wachs | B23D 21/04 266/56 |
| 4,625,464 | A | 12/1986 | Kubo | |
| 4,682,919 | A * | 7/1987 | Mitchell | B23D 21/04 30/97 |
| 4,763,413 | A * | 8/1988 | Rothenberger | B23D 21/08 30/100 |
| 4,944,205 | A * | 7/1990 | Ricci | B23B 3/26 82/113 |
| 5,159,756 | A * | 11/1992 | McGuire | F16L 41/06 30/92 |
| 5,596,914 | A * | 1/1997 | Liao | B23D 21/04 53/442 |
| 6,141,876 | A * | 11/2000 | Hamm | B23D 21/06 30/100 |
| 6,966,731 | B2 * | 11/2005 | Vanderpol | B23C 3/34 105/29.1 |
| 8,833,219 | B2 * | 9/2014 | Pierce | B23D 57/0007 30/102 |
| 2004/0234352 | A1* | 11/2004 | Vanderpol | B23C 3/122 409/178 |
| 2008/0216325 | A1* | 9/2008 | Loporchio | B23D 21/08 30/97 |
| 2013/0111764 | A1 | 5/2013 | Sterner | |
| 2014/0026731 | A1* | 1/2014 | Pierce | B26D 3/16 83/744 |
| 2014/0190322 | A1* | 7/2014 | Pierce | B23D 21/04 82/70.2 |
| 2017/0043419 | A1* | 2/2017 | Pierce | B23D 45/126 |

FOREIGN PATENT DOCUMENTS

| | | | |
|---|---|---|---|
| DE | 19614611 C2 | 1/2001 | |
| DE | 102004031756 A1 | 1/2006 | |
| DE | 202007016022 U1 | 4/2009 | |
| EP | 0427453 A1 * | 5/1991 | ............. F16L 41/06 |
| FR | 2782938 A1 | 3/2000 | |
| GB | 2242850 A | 10/1991 | |

* cited by examiner

MACHINING DEVICE FOR OUTER PIPE SURFACES

CROSS-REFERENCE TO RELATED APPLICATION(S)

This application claims the benefit of and priority to German Patent Application No. 10 2014 006 255.4, filed Apr. 28, 2014, the disclosure of which is herein incorporated by reference in its entirety.

BACKGROUND

This relates to a chain-type device for machining an outer surface of an object, in particular of an approximately cylindrical object such as a pipe. In one particular aspect, this relates to a scraper chain for tubular objects, in particular plastic pipes.

In many cases, the surfaces of pipes, cables or cylindrical rods must be machined before further treatment. In the case of cables, for example, it is necessary to remove an insulating layer, whereas when heat welding plastic pipes, the surface of the pipes must first be scraped prior to welding. A layer in the order of approximately 0.05 mm to 0.3 mm (or deeper for pipes with a larger bore) is removed from the areas to be welded together. This removes any trapped dirt from the production process and any age-related material changes that may arise from UV damage or surface weathering, for example, which would otherwise result in welds of low quality. Plastic piping on rolls has a certain degree of ovality resulting from the production process, which can also occur in straight plastic pipes due to long periods in storage.

A machining device in the form of a chain, also called a scraper chain, is known in practice, therefore, and is shown in FIGS. 1 and 2. FIG. 1 shows a schematic oblique view of such a conventional scraper chain. The scraper chain has a chain link 20 with a tool holder 10 and a plurality of chain links 60 as chain connecting links arranged like a ring around an object to be machined, such as a pipe, and can be tensioned by means of a tensioning means 80, 82 so that the tool holder 10 lies securely on the lateral surface. A scraper tool 30, for example a scraper blade or a planing tool which removes material from the surface of the object with an adjustable swarf thickness, is attached to the tool holder. In use, the scraper chain is manually moved circumferentially around the object by means of handles 90 attached to the chain, such that the lateral surface is removed substantially annularly or helically. As shown in FIG. 1, the tensioning means may have a tensioning strap 80 and a strap lock 82, but a spring device 84 may optionally be provided that elastically adjusts the length of the chain and facilitates adjustment of the chain tension to an optimal value. A tension gauge, not shown, may be provided on the spring device 84, for example, in order to indicate the chain tension.

FIG. 2 shows a schematic plan view of the underside of the tool holder 10 of the conventional scraper chain in FIG. 1. As shown in FIG. 2, the chain links 60 have a plurality of support rollers 70 arranged in pairs, with which they roll on the lateral surface of the object to be machined. The tool holder 10 has feed rollers 40, preferably two pairs of feed rollers. The axes of the feed rollers 40 can be adjusted by means of adjusting screws 50, 51 relative to the tool holder 10 and thus in relation to the pipe axis by an adjustable angle α, so as to roll at an angle to the scraper chain tensioned around a circumference of the lateral surface and thus to gradually move the scraper chain forward a bit along the pipe axis during a revolution. To do so, the feed rollers 40 have a surface with increased adhesiveness, for example a serrated surface, in order to forcibly cause a feed motion and not slide over the lateral surface at an angle to the axis of the support rollers. In this manner, the tool 30 is guided in a helical line around the lateral surface of the pipe, so as to machine the lateral surface without gaps when the feed rate is correctly set. To achieve this, the feed motion must be set in such a way that it is less than the cutting width of the tool 30, and preferably less than ¾ of the cutting width. Adjusting the feed motion by pivoting the axes of the feed rollers requires a great deal of experience on the part of the operator and is time-consuming due to the feed rate having to be checked and frequently readjusted. The feed rate is also limited to a relatively small amount, as the pivot range of the feed roller axes is small and because the scraper chain tensioned around the object to be machined remains aligned in the circumferential direction with its support rollers 70, which means that the support rollers 70 must slide at an angle over the lateral surface due to the feed motion in the axial direction, which in turn inhibits the feed motion in the axial direction.

SUMMARY

In one preferred embodiment, a machining device for machining the lateral surface of an approximately cylindrical object in portions thereof, said machining device comprising a chain for annularly surrounding the object to be machined, said chain consisting of at least two hingedly connectable chain links, one of which being a tool holder having at least one tool for machining the lateral surface and support rollers for rolling on the lateral surface, and the at least one other chain link being a chain connecting link, the chain links being connectable in such a way that they form a closed chain ring around the object to be machined, and further comprising a feed adjuster capable of reversibly adjusting an axial position of facing ends of two chain links parallel to the axis of the closed chain ring relative to each other.

Due to this relative axial displacement between the facing chain link ends, the chain ring adopts the shape of a helical line, such that all the support rollers of the tool holder and the chain connecting links are aligned in the direction of said helical line. All the support rollers resting on the surface thus run in the same direction and do not have to slide at an angle to their rolling direction over the lateral surface of the object to be machined. The advantageous result is that all the rollers of the chain ring resting on the surface contribute to the feed motion, thus resulting in the feed motion and indeed the entire orbital movement of the chain ring requiring less force and the feed motion being smoother, more reliable and more precise. Another ensuing advantage is that the feed rate can be set over a significantly larger range, because, as already mentioned, the support rollers of the chain connecting links likewise contribute to the feed motion and do not inhibit the latter, as is the case with the conventional scraper chain. The feed motion is also much more simple to adjust, in that the feed rate per revolution about the object to be machined is easily discernible and is essentially the same as the pitch of the helical line formed by the chain ring, i.e., as the axial displacement of the chain link ends relative to each other. This means that adjusting the feed rate does not require any special experience on the part of the operator and no longer needs to be readjusted. The feed adjuster preferably adjusts the axial position of the facing ends of the tool holder and of a chain connecting link that connects the facing ends. However, it is equally possible for the facing ends of two chain connecting links to be adjusted axially relative to each other. The feed adjuster may be a separate element arranged, for example, between the two chain links, or it may be integrally embodied with one of the chain links. The feed rate may also be set to zero, so that no feed motion ensues when the chain completes one revolution around the object to be machined, which is necessary, for example, when machining an annular bead on the lateral surface (such as a welding bead produced when butt welding plastic pipes with a heated tool), in order to fine down and remove said bead, for example.

In a further embodiment of the machining device, the chain has a plurality of chain connecting links, thus allowing the chain to be adjusted to almost any pipe diameter.

In another independent development of the machining device, at least one chain connecting link has support rollers for rolling on the lateral surface of the object to be machined. In this way, the chain can roll easily and smoothly over the lateral surface.

In an optional development of the machining device, the axial position of the facing ends of the two chain links relative to each other is infinitely adjustable. The axial position of the facing ends of the two chain links relative to each other can preferably be fixed reversibly.

In an independent development of the machining device, a measuring and gauging device is provided for adjusting the axial position of the facing ends of the two chain links relative to each other. This allows the feed rate to be adjusted in a particularly simple manner to a specific value that can be easily read from a scale, for example.

According to one particularly preferred embodiment of the machining device, the feed adjuster is formed by guide means on the one chain link and by counter-guide means on the other chain link, said means engaging each other.

As an option, the engagement of the guide means and the counter-guide means can be reversibly locked.

The guide means and the counter-guide means are preferably provided at the facing ends of the two chain links.

In one particularly preferred embodiment of the machining device, the guide means is formed by a guide groove extending parallel to the axis of the closed chain ring and the counter-guide means is formed by at least one guide piece which engages in said guide groove.

In an independent development of the machining device, the chain has at least one tensioning device for matching the circumferential length of the machining device to the circumference of the object to be machined and/or for adjusting the pressure with which the machining device is pressed onto the lateral surface. The tensioning device may preferably comprise a tensioning strap and a tightener, or may comprise a turnbuckle mechanism, for example.

The tensioning device may optionally be part of the tool holder. Alternatively, the tensioning device may also be part of the chain connecting link.

In one independent development of the machining device, the tool holder and/or the chain connecting link have handles with which the machining device can be moved manually in the circumferential direction of the object to be machined.

In another independent development of the machining device, the tool holder and/or the chain connecting link have at least one drive roller which can be driven by a drive means in order to move the machining device in the circumferential direction of the object to be machined. This allows the chain to move particularly smoothly around the object to be machined and a very uniform feed motion to be achieved, thus allowing the lateral surface to be optimally and uniformly machined independently of the operator.

The tool holder may be configured to guide a replaceable stationary tool, in particular a machining tool, preferably in an adjustable position, over the lateral surface in order to machine the lateral surface.

In particularly preferred embodiments of the machining device, the tool holder may be configured to guide a replaceable motor-driven tool, in particular a rotating machining tool, in the adjustable position over the lateral surface in order to machine the lateral surface. Very simple handling combined with simultaneously optimized machining quality can be achieved in this manner, and very little force is needed to move the chain in the circumferential direction around the object to be machined, since the tool itself exerts very little resistive force.

According to one aspect that is independent of the aforementioned embodiments, the tool holder may have a suspension device for the motor-driven tool, said suspension device being capable of lowering the tool onto the lateral surface and lifting it from the latter, thereby keeping a rotational axis of the motor-driven tool substantially parallel to the axis of the closed chain ring.

This suspension device may optionally include a spring device which pushes the motor-driven tool elastically toward the lateral surface.

In an independent development of this aspect, the suspension device may include a lifting and lowering device which can lift the motor-driven tool in controlled movements off the lateral surface and lower it onto the lateral surface and which prevents uncontrolled lowering.

Optionally, the suspension device may also be capable of tilting the tool additionally about an axis extending tangentially to the lateral surface.

Other advantageous configurations and an embodiment shall now be described with reference to the description of an embodiment and to the attached drawings. The terms "top", "bottom", "left" and "right" used when describing the embodiment relate to the drawings oriented in such a way that the reference signs and names of the figures can be read normally in the drawings.

Various aspects will become apparent to those skilled in the art from the following detailed description and the accompanying drawings.

DETAILED DESCRIPTION

Figure 3:
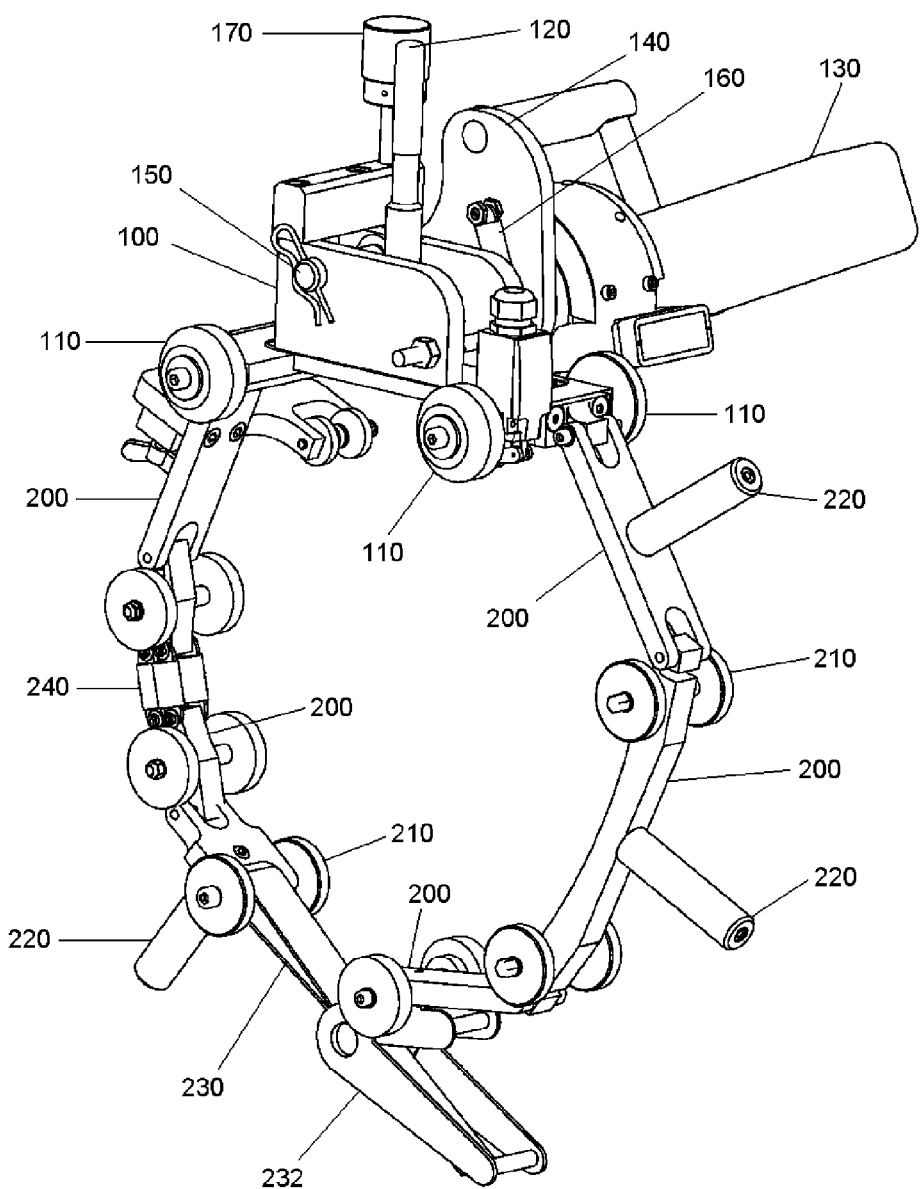
FIG. 3 shows a schematic oblique view of a machining device according to a preferred embodiment.
Figure 4:
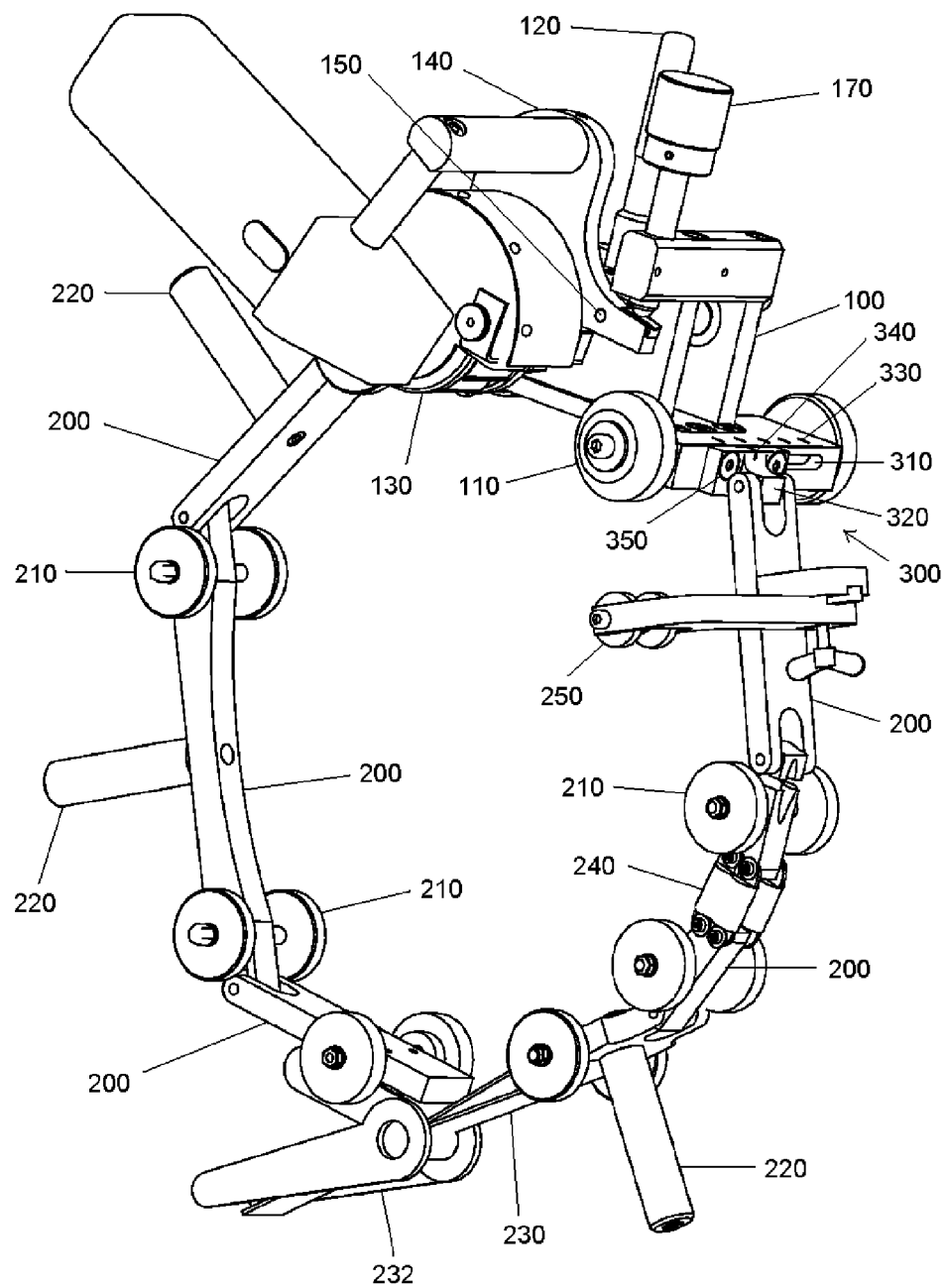
FIG. 4 shows another schematic oblique view of a machining device according to a preferred embodiment.

In one particularly preferred embodiment, shown in FIGS. 3 and 4, the machining device comprises a chain consisting of at least two chain links 100, 200, which are hingedly connectable to each other in such a way that they form a closed chain ring and annularly surround a cylindrical object to be machined, for example a plastic pipe. The central axis of the closed chain ring then coincides substantially with the axis of the pipe. One chain link is a tool holder 100 which preferably comprises two pairs of support rollers 110 for rolling on the lateral surface of the pipe. Another chain link is a chain connecting link 200. The chain preferably has a plurality of chain connecting links 200, any number of which may be added to adapt the chain to larger pipe diameters, similar to what was shown for the conventional scraper chains described in the foregoing. At least some of the chain connecting links 200 also have support rollers 210 for rolling on the lateral surface. One chain link, preferably a chain connecting link 200, also has a tensioning device, for example a tensioning strap 230 and a tightener 232, similar to that in the conventional scraper chain described above, in order to adjust the length of the closed chain ring more exactly to the circumference of the pipe and to tighten the chain ring onto and around the lateral surface so that it presses onto it with an adjustable pressure. In the embodiment shown in FIGS. 3 and 4, the chain connecting link 200 shown at the top right includes the tensioning device 230, 232 and can be hingedly connected to the tool holder 100 by means of its tightener 232. For simple adjustment of the pressure applied, a spring device 240 (as in the conventional scraper chain), and a measuring and gauging device (not shown) which is advantageously embodied on the spring device 240 and indicates the tension on the chain, are provided on one chain link. The tensioning device may simultaneously be detachable as well, and can be used as a closing device for opening and closing the chain ring. As an alternative to the tensioning strap, the tensioning device may also include, for example, a turnbuckle mechanism or the like, with an adjustable length.

When the chain links, i.e., tool holder 100 and the at least one chain connecting link 200, are connected to the closed chain ring, the support rollers 110, 210 of all the chain links are aligned in the same direction, namely in the circumferential direction of the chain ring, so as to roll substantially in the circumferential direction around the lateral surface of the pipe such that, in operation, tool holder 100 orbits the pipe axis. In the preferred embodiment described here, at least some of the chain connecting links 200 are provided with handles 220, with the aid of which an operator can move the chain manually in the direction of travel, i.e., in the circumferential direction about the pipe axis. Tool holder 100 may likewise have such a handle 110.

In the preferred embodiment, tool holder 100 is used to carry and guide a motor-driven plane 130 in an adjustable position relative to the lateral surface of the pipe, in order to machine or scrape away the lateral surface. The cutting depth is preferably adjustable and can be determined by the motor-driven tool, which is adapted accordingly and may have guide members on either side of a rotating planing tool (blade roller), as described more precisely in patent application DE 10 2010 047 859 A1.

In the preferred embodiment shown in FIGS. 3 and 4, tool 130 is mounted by means of a suspension device on tool holder 100. In the machining device tightened around the pipe to be machined, the suspension device is able to lower tool 130 onto the lateral surface of the object to be machined and to lift it off the lateral surface. The suspension device has a bearing axle 150 which is substantially parallel to the central axis of the chain ring and preferably a spring device 160. The motor-driven tool 130 preferably has a side plate 140 which is perpendicular to the rotational axis of the rotating planing tool and which can be pivotably attached to the bearing axle 150 of tool holder 100. Instead of the side plate shown here, some other element of the motor-driven tool may be attached accordingly to bearing axle 150. The rotating planing tool 130 can be pivoted about axle 150 and brought closer to, or lifted off, the lateral surface of the object to be machined, the rotational axis of planing tool 130 being kept substantially parallel to the pipe axis and to the central axis of the chain ring. The optional spring device may include a tension spring 160 and can be brought into engagement with the pivotably mounted side plate 140 in order to push the latter elastically toward the lateral surface, so that tool 130, in an operating position, is pressed with a substantially constant force onto the lateral surface.

In order to facilitate simple handling, safe fitting of the machining device around the object to be machined, and safe starting of the motor-driven, rotating planing tool 130, the suspension device preferably has a lowering device for controlled lowering of tool 130 onto the lateral surface. In the embodiment shown, the lowering device includes a lowering screw 170 which sits in a thread provided in tool holder 100 and which can be moved in its axial direction by the operator turning it. When lowering screw 170 is turned in the one direction, the bottom end of lowering screw 170 is pressed against a shoulder formed on side plate 140 away from bearing axle 150, thus pivoting the tool by a leverage effect against the force of tension spring 160 and lifting it from the lateral surface. When the lowering screw 170 is turned in the other direction, the pivoting direction is reversed accordingly, and tool 130 is then pivoted by the force of tension spring 160 in the direction of the lateral surface, until it rests thereon. Other lifting and lowering devices for controlled lowering of the tool mounted via the suspension device are likewise possible, such as pivoted levers, eccentric cam devices, or the like. It is advantageous in this regard if such devices force controlled or at least cushioned movement of the suspension device, thus preventing any uncontrolled, excessively fast or abrupt lowering and placement.

Suspension device 150, 160, 170 facilitates safe application and operation of the machining device, as tool 130 can firstly be started and subsequently lowered in a controlled manner onto the lateral surface of the object to be machined, without the risk of kickback that can arise when the tool is switched on in the lowered position. Due to the rotational axis of the tool being guided substantially parallel to the pipe axis, and the constant compressive force with which the tool is placed onto the lateral surface to be machined, it is also possible for the lateral surface to be machined in a particularly reliable and uniform manner. In one variant of this embodiment, it is also possible to leave out tension spring 160 and to couple the tilting mechanism of the suspension device securely with the lifting and lowering device (for example with a rod and articulated joints), so that the position of the tool relative to the tool holder is determined precisely by the position of the lifting and lowering device, and has no spring-loaded play. In another variant of the embodiment, it is also possible to provide a linear slide mechanism (for example, a groove and a counterpiece guided therein) instead of the tilting mechanism described in the foregoing, in order to move the motor-driven tool toward and away from the lateral surface. Such a slide mechanism may likewise be preferably spring-loaded and provided with the lifting and lowering device described above.

In another development, the suspension device is adapted in such a way that, if so required, it additionally allows tool 130 to tilt about a tilt axis extending tangentially to the lateral surface, such that the rotational axis of tool 130 can be inclined relative to the central axis of the chain ring and thus in relation to the axis of the pipe to be machined. Tool 130 can thus be pressed, for example by means of a further spring device, onto a non-cylindrical or conically shaped lateral surface, in order to machine such a surface also. Such substantially conical lateral surfaces may occur at the ends of the pipe to be machined, if a pipe has been machined or formed in such a way, or if the pipe has conical or oblique ends. The suspension device may also be optionally adapted such that it allows the tool axis to be fixed at a specific tilt angle. It is possible in this way to provide a pipe end with a bevel, for example, if the tool is guided in such a tilted position in the circumferential direction around the end of the pipe.

Figure 1:
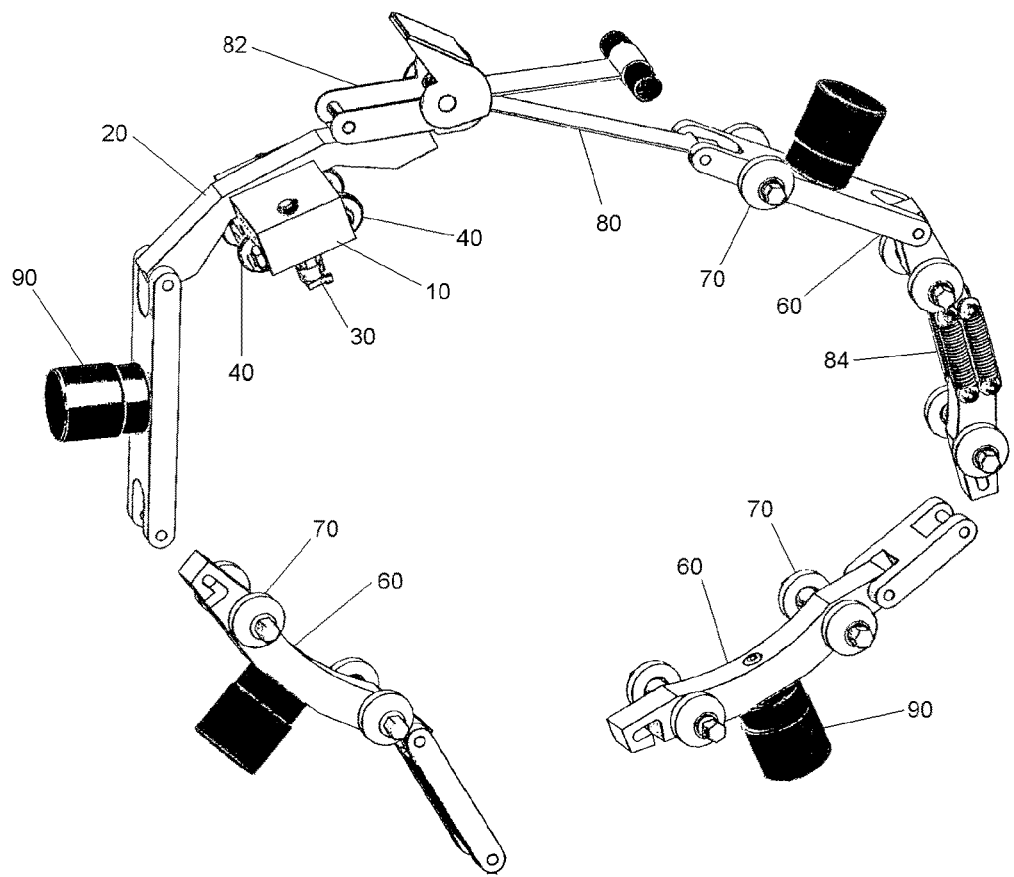
FIG. 1 shows a schematic oblique view of a prior art scraper chain.
Figure 2:
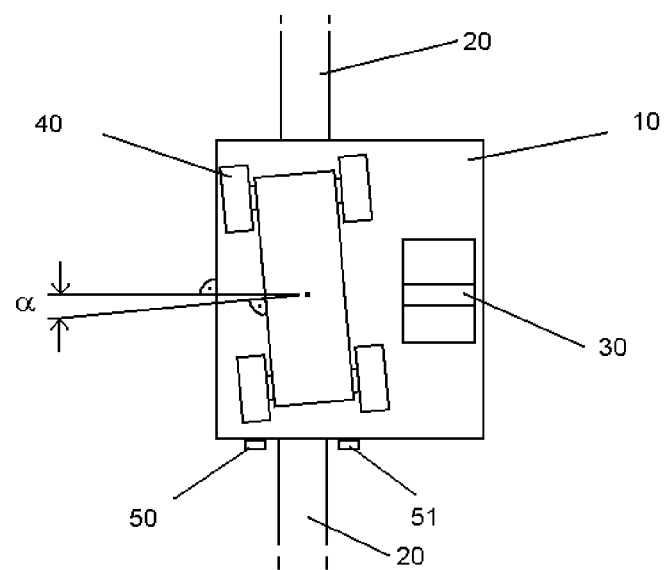
FIG. 2 shows a schematic plan view of the underside of the prior art tool holder in FIG. 1.

As mentioned above, a stationary tool, such as an adjustable scraper blade, may be attached instead of the motor-driven tool 130 to the tool holder, as illustrated in FIGS. 1 and 2 for the conventional scraper chain.

In a configuration of the preferred embodiment that is totally independent of how tool 130 is mounted on tool holder 100, a feed adjuster 300 is also provided on tool holder 100, as shown in more detail in FIG. 4. As mentioned above, however, the feed adjuster may equally well be formed on a chain connecting link. In the preferred embodiment shown here, said feed adjuster 300 includes, as a guide means, a groove 310 embodied on the tool holder, and, as a counter-guide means, a guide piece 320 which engages in said groove 310 and which can move along groove 310. Groove 310 is aligned substantially parallel to the central axis of the closed chain ring. Guide piece 320 is infinitely variably movable in groove 310 and can be fixed in any position on or in the groove and released again by means of a fixing device, such as a clamping screw. When the chain ring is closed, a chain connecting link 200 is hingedly connected at one of its ends to guide piece 320. As shown in FIG. 4, the guide piece may also be hingedly and securely connected to a chain link 200.

In a specific position inside the groove, which can be an edge or end position at one end of groove 310, guide piece 320 is in true alignment, in the direction of travel of tool holder 100, with an end of another chain connection link 200 hingedly connected to the opposite side of tool holder 100. That means that the axial position of the end of chain connecting link 200 hingedly connected to guide piece 320 (i.e., its position along the axis of the closed chain ring and the axis of the object to be machined) is the same as the axial position of the facing end of tool holder 100 (i.e., the extension of the line of alignment of the other chain connecting link hingedly connected to the opposite end of the tool holder), so that the closed chain ring forms a circular ring without any axial displacement. In other words, the chain ring forms a helix with zero pitch. In this setting, a feed rate of zero is set, i.e., the chain ring runs on a circular line of the lateral surface around the pipe, with all the support rollers 110, 210 of chain links 100, 200 being substantially aligned along said circular line and rolling along same. In this way, the machining device can be used, for example, to provide a pipe end with a bevel, as mentioned above, or to remove a welding bead between two welded plastic pipes that have been butt welded to each other. To that end, a bead roller 250 having a convex profile and able to roll on the lateral surface with its two parallel contact surfaces on either side of the bead may be provided on a chain link. By this means, the machining device can be aligned in a simple manner on the bead and be guided along the length thereof.

In other, different positions of guide piece 320 inside groove 310, the end of chain connecting link 200 hingedly connected to guide piece 320 is axially displaced or offset relative to the facing end of tool holder 100. The chain ring then forms a helical line with a pitch equal to the axial displacement of the chain link ends facing each other. All the support rollers 110, 210 of chain links 100, 200 are thus aligned along said helical line and roll along that helical line on the lateral surface of the pipe. A complete revolution thus results in the machining device being advanced in the axial direction by approximately the same axial displacement of the facing ends of the chain links at feed adjuster 300. There is basically no lateral or axial slip at support rollers 110, 210, and all the support rollers resting on the lateral surface contribute to the forward feed. This results in a very reliable and uniform feed in the axial direction, and the amount of force needed for movement in the circumferential direction is significantly reduced in comparison with the conventional scraper chain, because there is no need to force any axial sliding of support rollers transversely to the circumferential direction. For that reason, it is also unnecessary, although possible, to embody support rollers with a serrated surface or the like, in order to increase their adhesiveness and lateral guiding force on the surface, as described for the support rollers of the tool holder in the case of the conventional scraper chain. If guide piece 320 is not disposed at the end of groove 310 when the feed rate is set to zero, then it is possible, depending on the direction in which guide piece 320 is axially offset, to set a positive feed rate or a negative feed rate, i.e., a selectable feed rate in either of the two axial directions of the pipe, while keeping the same circumferential direction of travel of the chain ring.

It is preferable that feed adjuster 300 also has a measuring and gauging device that measures and indicates the feed rate set, so that the operator can easily set the feed rate and can easily read the setting at any time. In the preferred embodiment as shown in FIG. 3, said measuring and gauging device is realized by a scale 330 on groove 310, to which a mark 340 on guide piece 320 points. The feed rate is preferably indicated on the scale in the form of a simple measure of length, e.g. in millimeters (mm) or the like, and which is equal to the pitch of the helical line formed by the chain ring and which is therefore substantially equal to the amount of feed in the axial direction when the machining device moves once around the pipe to be machined. If the cutting width of tool 130 is known, then it is particularly simple to set a suitable feed rate of, for example, ¾ of the cutting width.

In variants of the preferred embodiment described here, groove 310 of feed adjuster 300 may also be formed on a chain connecting link 200, and guide piece 320 may be hingedly connected to tool holder 100 or to some other chain connecting link 200. Where exactly on the closed chain ring an axial displacement of facing chain link ends is effected by means of the feed adjuster is of no significant for the function of the feed adjuster and the function of the machining device.

While principles and modes of operation have been explained and illustrated with regard to particular embodiments, it must be understood, however, that this may be practiced otherwise than as specifically explained and illustrated without departing from its spirit or scope.

The invention claimed is:

1. A machining device for machining of a lateral surface of an approximately cylindrical object in portions thereof, the device comprising:
   a chain for annularly surrounding the object to be machined, said chain comprising first and second hingedly connectable chain links and a tool feed adjuster,
   wherein said first chain link comprises a tool holder having at least one tool for machining the lateral surface and further comprises support rollers for rolling on the lateral surface, and wherein said second chain link is a chain connecting link,
wherein said first and second chain links are connectable in such a way that they form a closed chain ring around the object to be machined, and
wherein said tool feed adjuster is capable of reversibly adjusting an axial position of facing ends of first and second chain links relative to each other, parallel to the axis of the closed chain ring.

2. The machining device according to claim 1,
wherein the chain has a plurality of chain connecting links.

3. The machining device according to claim 1,
wherein the axial position of the facing ends of the first and second chain links relative to each other is adjustable.

4. The machining device according to claim 3,
wherein the axial position of the facing ends of the first and second chain links relative to each other can be reversibly secured by a fixing device which connects a guide means of one of the first and second chain links to a counter-guide means of the other of the first and second chain links.

5. The machining device according to claim 1,
wherein a measuring and gauging device is provided for adjustment of the axial position of the facing ends of the first and second chain links relative to each other.

6. The machining device according to claim 1,
wherein the feed adjuster is formed by guide means on the one chain link and by counter-guide means on the other chain link, said means engaging each other.

7. The machining device according to claim 6,
wherein the engagement of the guide means and the counter-guide means is reversibly lockable.

8. The machining device according to claim 6,
wherein the guide means and the counter-guide means are provided at the facing ends of the first and second chain links.

9. The machining device according to claim 6,
wherein the guide means is formed by a guide groove extending parallel to the axis of the closed chain ring and the counter-guide means is formed by at least one guide piece which engages in said guide groove.

10. The machining device according to claim 1,
wherein the chain has at least one tensioning device for at least one of matching the circumferential length of the machining device to the circumference of the object to be machined and adjusting the pressure with which the machining device is pressed onto the lateral surface.

11. The machining device according to claim 10,
wherein the tensioning device is part of the tool holder.

12. The machining device according to claim 10,
wherein the tensioning device is part of the chain connecting link.

13. The machining device according to claim 1,
wherein at least one of the tool holder and the chain connecting link has at least one handle with which the machining device can be moved manually in the circumferential direction of the object to be machined.

14. The machining device according to claim 1,
wherein at least one of the tool holder and the chain connecting link have at least one drive roller which can be driven by a drive means in order to move the machining device in the circumferential direction of the object to be machined.

15. The machining device according to claim 1,
wherein the tool holder is configured to guide a replaceable stationary tool, in particular a machining tool, in an adjustable position, over the lateral surface in order to machine the lateral surface.

16. The machining device according to claim 1,
wherein the tool holder is configured to guide a replaceable motor-driven tool, in particular a rotating machining tool, in an adjustable position over the lateral surface in order to machine the lateral surface.

17. The machining device according to claim 16,
wherein the tool holder has a suspension device for the motor-driven tool, said suspension device being capable of lowering the tool onto the lateral surface and lifting it from the latter, thereby keeping a rotational axis of the motor-driven tool substantially parallel to the axis of the closed chain ring.

18. The machining device according to claim 17,
wherein the suspension device includes a spring assembly which pushes the motor-driven tool elastically toward the lateral surface.

19. The machining device according to claim 17,
wherein the suspension device includes a lifting and lowering device which can lift the motor-driven tool in controlled movements off the lateral surface or lower it onto the lateral surface and which prevents uncontrolled lowering.

20. The machining device according to claim 17,
wherein the suspension device is further capable of tilting the tool additionally about an axis extending tangentially to the lateral surface.

* * * * *